United States Patent [19]

Wallerstein, Jr.

[11] 3,866,720
[45] Feb. 18, 1975

[54] FRICTION DAMPER
[75] Inventor: Leon Wallerstein, Jr., Erie, Pa.
[73] Assignee: Lord Corporation, Erie, Pa.
[22] Filed: Sept. 20, 1973
[21] Appl. No.: 399,763

[52] U.S. Cl. ................... 188/67, 213/37, 267/9 R, 293/85
[51] Int. Cl. ............................................ B65h 59/10
[58] Field of Search ............ 188/129, 67, 1 R, 1 B; 104/254, 249; 213/37; 267/9 R; 293/85

[56]    References Cited
UNITED STATES PATENTS

| 1,293,809 | 2/1919 | Kux | 188/129 |
| 1,463,284 | 7/1923 | Lang | 188/129 |
| 1,825,086 | 9/1931 | Ohlendorf | 293/85 |
| 3,468,432 | 9/1969 | Baillie | 213/37 |
| 3,690,413 | 9/1972 | Airheart | 188/1 B |

FOREIGN PATENTS OR APPLICATIONS

| 566,124 | 12/1932 | Germany | 188/129 |
| 1,167,999 | 12/1958 | France | 188/129 |

*Primary Examiner*—Trygve M. Blix
*Assistant Examiner*—Edward R. Kazenske

[57]    ABSTRACT

A friction damper for dissipating mechanical energy at a substantially uniform force level is provided comprising a housing and an elongate bar disposed within the housing for reciprocating longitudinal movement relative to each other. At least one friction shoe is arranged between the housing and bar for reciprocating movement parallel thereto and is urged into frictional engagement with one of the housing and bar. Relative sliding frictional movement is provided between the friction shoe and the one of the housing and bar during an energy absorbing stroke to dissipate energy. In the return stroke, a spacing device is operative to relieve the frictional engagement of the shoe and the one of the housing and bar. Spring device is preferably included to initiate the return stroke, actuate the spacing device and complete the return stroke.

18 Claims, 10 Drawing Figures

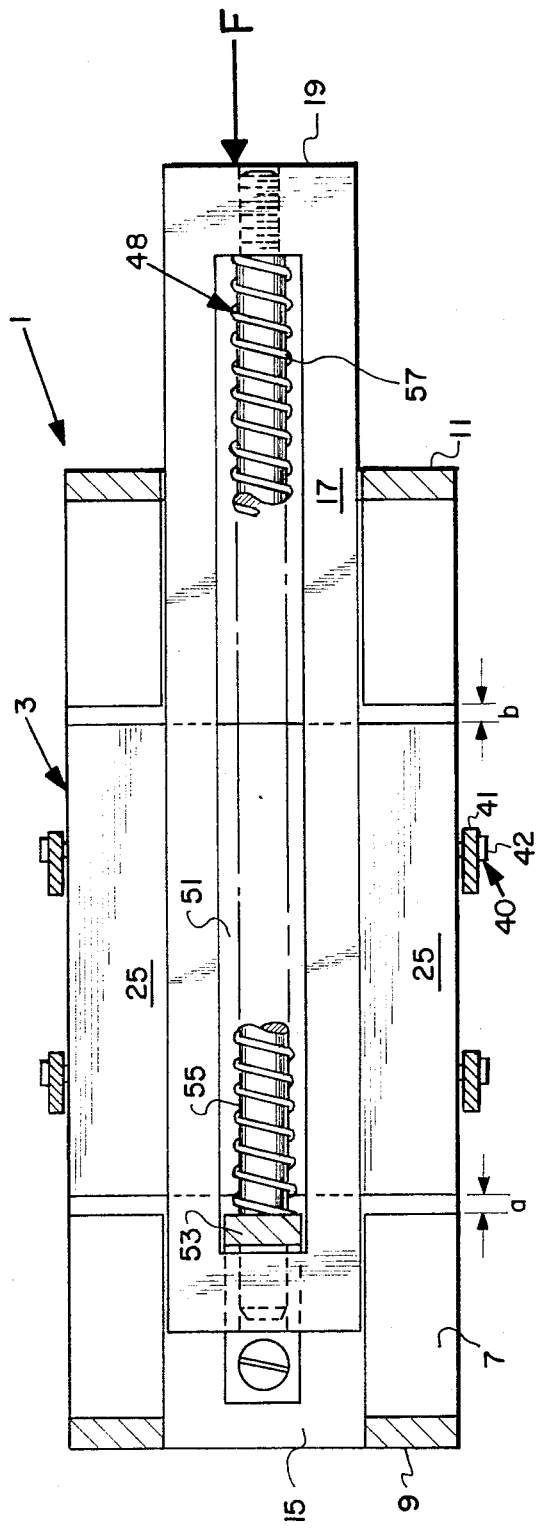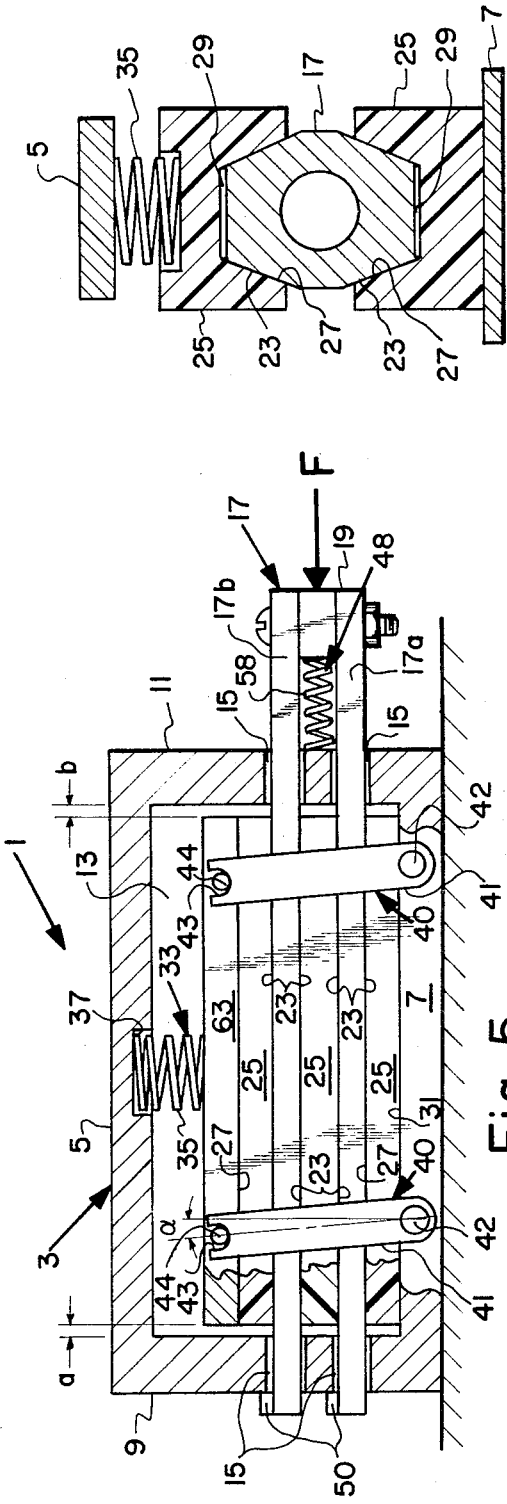

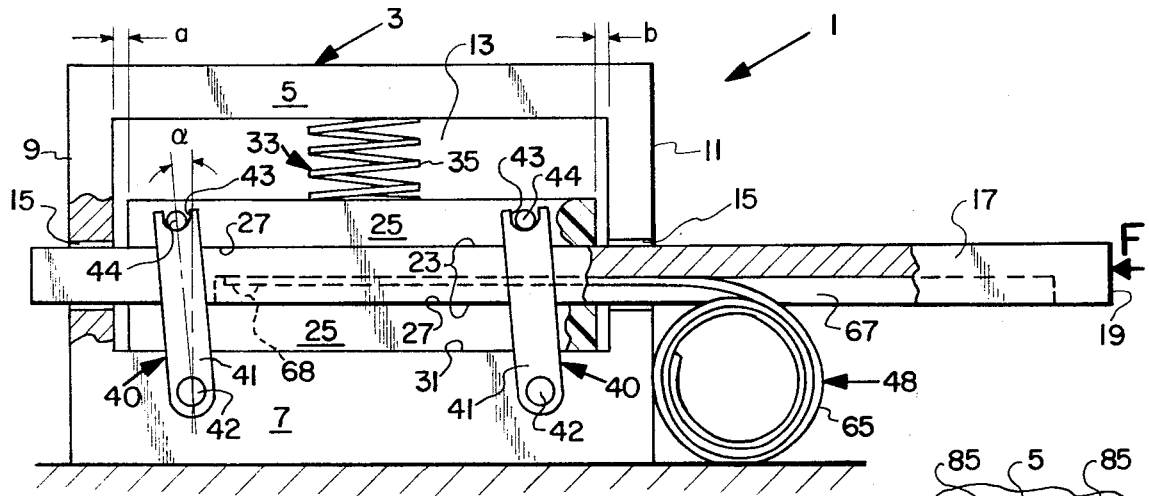
Fig. 7.
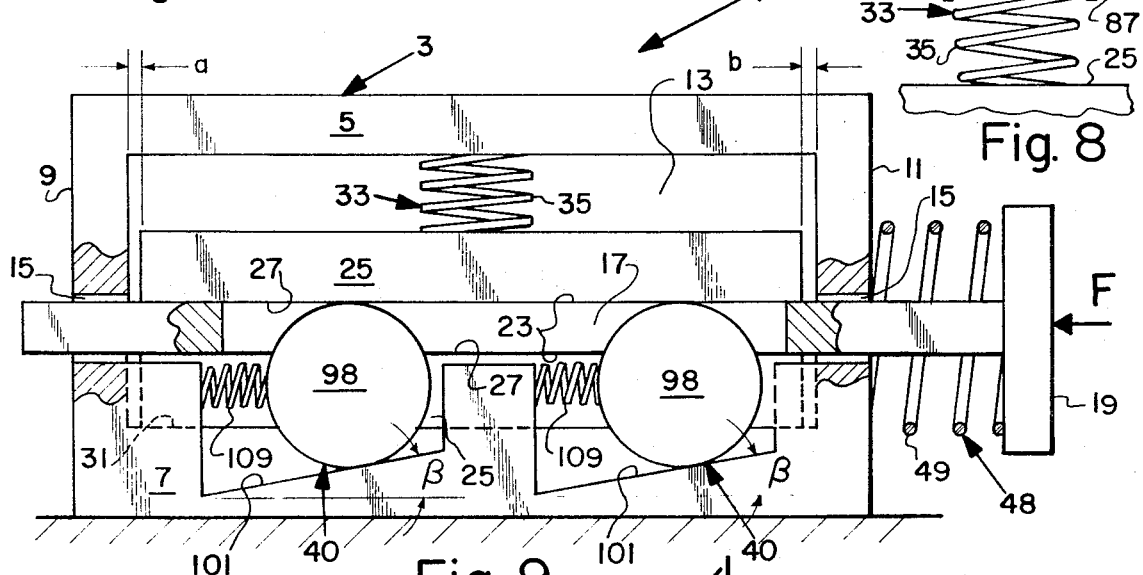
Fig. 8.
Fig. 9.
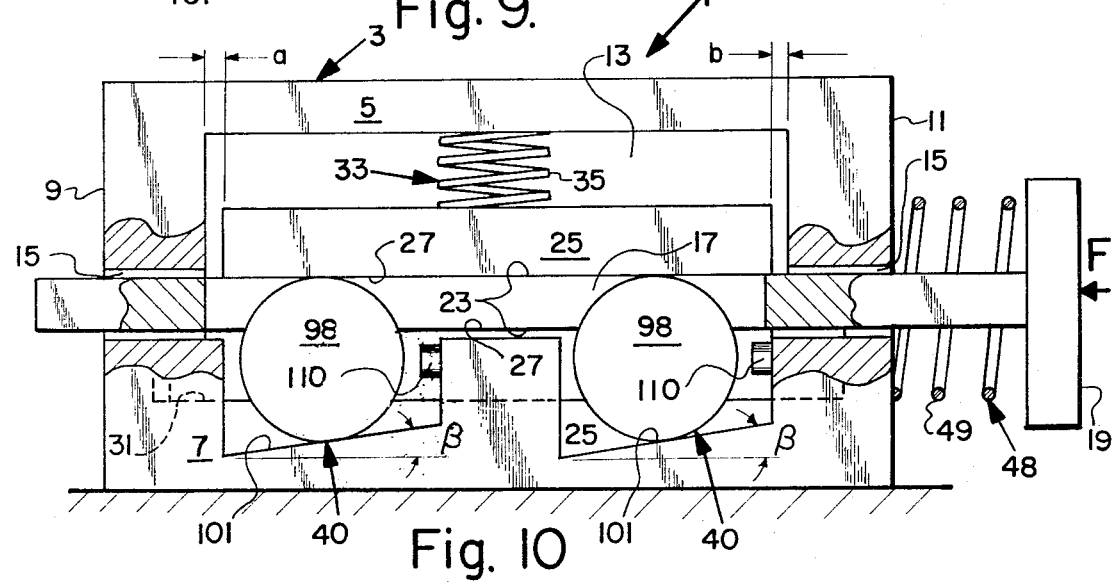
Fig. 10

3,866,720

FRICTION DAMPER

BACKGROUND OF THE INVENTION

1. Field of the Invention

This invention relates to mechanical energy or shock absorbing devices and more particularly to friction dampers.

2. Description of the Prior Art

Shock absorbers or dampers are generally of the hydraulic or friction type. Hydraulic dampers normally dissipate energy by forcing a viscous fluid through a restricted orifice. The resistant force generated by such hydraulic dampers is inherently a function of the velocity at which the fluid is forced through the orifice. Thus, relatively high forces may be generated which can result in damage to the various structures involved. Of perhaps equal importance is the large deflection or relative motion accommodation that must be provided to dissipate the energy of an impacting body.

Friction dampers on the other hand dissipate energy by the sliding of frictional surfaces relative to each other. They are particularly noted for their ability to operate at a uniform or constant force level irrespective of speed. By dissipating energy at a constant force level, the energy dissipation for a given motion accommodation can be maximized. However, they typically have the disadvantage that an equal force level is normally required to return them to an operative position. In many instances, strong resilient springs are included to provide the return feature. However, these springs must be compressed during the energy absorbing stroke and, thus, distract from the advantages of friction dampers. In still other instances, external equipment such as actively controllable hydraulic devices have been used to create pressure between the relative sliding friction surfaces during the energy absorbing stroke and controlled to relieve the pressure for and during the return stroke to facilitate easy relative movement in the return stroke.

Various other techniques have been suggested for controlling the operation of a friction damper. Such a friction damper is disclosed in Ohlendorf, U.S. Pat. No. 1,825,086. In that patent, there is disclosed a friction damper wherein a friction strip or shoe is urged into frictional engagement with a sliding bar by rollers which roll on inclined surfaces or links which pivot in response to movement of the sliding bar. The rollers or links are operative in the energy absorbing stroke to increase the pressure between the frictionally engaging shoe and sliding bar. It should be recognized that the resistance force of the damper thus increases until means restrict further rolling or pivoting movement whereupon a uniform resistance force is established. In the return stroke, the rollers or links allow the friction shoe to disengage the slider bar through forces of gravity. However, as will be apparent, a force equal to the maximum resistant force established will be necessary to initiate the return stroke. Thus, a strong spring or its equivalent is required. Also, very critical parameters must be maintained to prevent inoperativeness of that damper in the energy absorbing stroke. Otherwise, lockup or relatively free sliding movement may result.

SUMMARY OF THE INVENTION

With the above in mind, it is an object of the present invention to provide a friction damper which requires a relatively small force comparable to that of the resistant force of the damper to initiate and complete the return stroke.

Another object of the present invention is to provide a friction damper which is inherently self-returnable while maintaining a substantially uniform resistant force during the energy absorbing stroke.

And still another object of the present invention is to provide a friction damper which is not readily subject to inoperativeness in the energy absorbing stroke and wherein the return stroke can be initiated by a force substantially smaller than the maximum resistant force of the damper.

Briefly, the above objects are accomplished in a friction damper including a housing and an elongate bar disposed within and through the housing for reciprocating longitudinal movement relative to each other. Friction shoe means is arranged between the housing and bar for reciprocating movement parallel thereto and is urged into frictional engagement with one of the housing and bar. In the preferred embodiment, spring means is precompressed between the shoe and the other of the housing and bar normal to their longitudinal axis to so urge the shoe means. Relative sliding frictional movement is provided between the friction shoe and the one of the housing and bar during an energy absorbing stroke to dissipate energy at a substantially uniform force level. Relatively free limited movement between the bar and housing is allowed during the initial part of the return stroke. Spacing means is operative during this initial relatively free movement to relieve the frictional engagement between the shoe and one of the bar and housing. Spring means is preferably operative between the bar and housing to initiate and complete the return stroke. Due to the initial relatively free movement between the bar and housing and action of the spacing means, the force required for the return stroke is substantially smaller than that of the maximum energy dissipating force.

BRIEF DESCRIPTION OF DRAWINGS

FIG. 4 is a sectional view taken substantially along the line 4—4 of FIG. 3.

FIG. 5 is a side elevation view with parts in section of a further embodiment of the friction damper of this invention.

FIG. 6 is an end elevation cross sectional view of a portion of still another embodiment of this invention.

FIG. 7 is a side elevation view with parts in section of still a further embodiment of this invention.

FIG. 8 is a segmented view with parts in section of an embodiment of this invention illustrating means for urging the friction shoe into engagement with one of the bar and housing.

FIGS. 9 and 10 are side elevation views with parts in section of other embodiments of the invention wherein rolling elements are employed as the spacing means.

DESCRIPTION OF PREFERRED EMBODIMENTS

Figure 1:
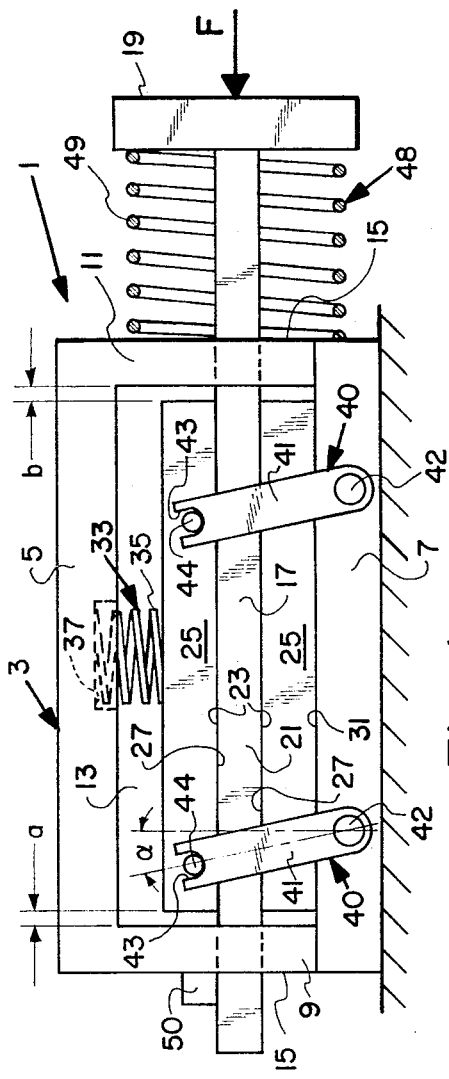
FIG. 1 is a side elevation view of an embodiment of the friction damper of this invention.
Figure 2:
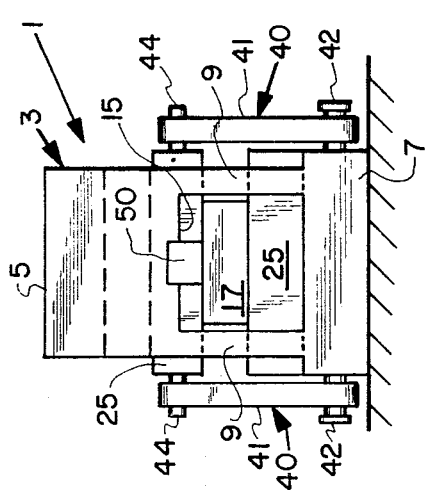
FIG. 2 is an end elevation view of the friction damper of FIG. 1.

With reference now to the various drawings, there is shown in FIGS. 1 and 2 a friction damper 1 of the present invention. The damper 1 comprises a housing 3 including opposed elongate side members 5 and 7 fixedly secured in uniform spaced relation by two pairs of legs 9 and 11, respectively, which form opposite ends of the housing 3. Each pair of legs 9 and 11 are spaced transversely of members 5 and 7 to define diametrically opposed side and end openings 13 and 15, respectively.

An elongate bar 17 is disposed within housing 3 and is adapted for reciprocating longitudinal movement relative to the housing 3. One end of bar 17, preferably as shown, extends through and beyond one end of the housing 3 and defines a reaction surface 19 for receiving an input force F that will force or urge bar 17 to the left relative to the housing 3 (FIG. 1) in an energy absorbing stroke. Bar 17 includes a central body portion 21 having opposed parallel and planar work surfaces 23. A pair of friction shoes 25 are arranged within the housing 3 on opposite sides of the bar 17 adjacent work surfaces 23. Friction shoes 25 are formed of a wear-resistant material having a high coefficient of friction. Each shoe 25 has a drag surface 27 that mates with a work surface 23 of bar 17. Relative sliding movement between the work and drag surfaces 23 and 27 results in the friction dissipation of energy at a uniform force level.

As shown, the friction shoes 25 are wider than end openings 15 but shorter in length than side openings 13 by the sum of distances "a" and "b" as indicated. As a result, friction shoes 25 are permitted limited longitudinal movement relative to housing 3. Upon movement of the shoes 25 the distance a relative to the housing 3, further movement is prevented by abutment of shoes 25 with housing legs 9. Upon movement of the shoes 25 the distance b relative to the housing 3, further movement is prevented by abutment of shoes 25 with housing legs 11.

Lower housing member 7 includes an upper surface 31 that supports thereon lower friction shoe 25 which in turn supports bar 17 and upper friction shoe 25. It is essential in the operation of the friction damper 1 that the surface 31 and the adjacent and mating surface of lower friction shoe 25 be of low coefficient of friction to allow relatively free sliding movement therebetween the distances a and b. Conventional means may be employed to provide such low coefficient of friction.

A spring means 33 in the form of a coil spring 35 is precompressed between the upper housing member 5 and the upper friction shoe 25. Preferably as shown, the coil spring 35 has one end received in a recess 37 formed in the upper housing member 5 to maintain location thereof centrally of the housing 3. The precompressed coil spring 35 establishes a normal force between the housing members 5 and 7 and shoes 25 to force or urge the drag surfaces 27 of the shoes 25 into frictional engagement with the working surfaces 23 of bar 17.

Spacing means 40 are provided at longitudinally spaced intervals along the housing 3 for controlling the frictional engagement between the friction shoes 25 and bar 17. More particularly, the spring means 40 are operative in the return stroke, movement of the bar 17 to the right relative to the housing 3, for relieving the normal force of coil spring 35 between the shoes 25 and bar 17. The spacing means 40 comprises two pair of toggles or links 41 for limiting the spacing of upper friction shoe 25 relative to lower housing member 7. A pair of links 41 are disposed on opposite sides of the housing 3. The links 41 are pivotally connected at one end to lower housing member 7 by pivot pins 42. The other end of the links 41 include open ended slots 43 longitudinally thereof that engagingly receive pivot pins 44 carried by upper shoe 25. In the inactive position of the damper as shown in FIGS. 1 and 2 the links are inclined at an angle $\alpha$ longitudinally of the housing member 7 in the direction of the energy absorbing stroke of bar 17.

Spring means 48 are provided to initiate and complete the return stroke of the damper to an inactive position. Spring means 48 is in the form of a coil spring 49 that is disposed concentric to bar 17 and is disposed in compression loading relation between the bar 17 and housing 3. Spring 49 is preferably precompressed. The spring 49 urges the bar 17 to the right in the return stroke direction to the inactive position shown with clearances a and b between the friction shoes 25 and housing ends. Stop means 50 is employed to limit the movement of the bar 17 in the return stroke direction and defines the inactive position of the damper 1. In this instance, stop means 50 is a lug carried by the end of bar 17 remote from the reaction surface 19 that abuts housing 3 and restrains expansion of precompressed spring 49.

In this inactive position of damper 1, clearance a is provided between the shoes 25 and housing 3 to insure that the links 41 will pivot during relatively free sliding movement of lower friction shoe 25 relative to lower housing member 7 to disengage pivot pins 44 and allow complete application of the force of spring 35 in establishing a fractionally resistant force. In the return stroke of bar 17, the links 41 will pivot to close the angle $\alpha$ and urge upper friction shoe 25 upwardly against spring 35 to relieve the force between the frictionally engaging surfaces. However, links 41 must not under any circumstances be allowed to pivot to entirely close the angle $\alpha$ or to pivot past an angle of $\alpha = 0$ in the return stroke direction. Accordingly, distance b should be less than the product of the length of links 41 between pivots and the sin of angle $\alpha$ in the inactive position of damper 1.

Operationally, an input force F will react against reaction surface 19 to urge bar 17 to the left relative to housing 3. Spring 49 will be compressed and friction shoes 25 will be urged to the left relative to housing 3 with bar 17. The low frictional contact between lower friction shoe 25 and lower housing member 7 will allow relatively free movement of bar 17 and shoes 25 relative to housing 3 except for spring 49 until the distance a is closed. During this movement over distance a, links 41 will pivot to disengage from pivot pins 44 and allow spring 35 to apply a normal force between the friction shoes 25 and bar 17. Following movement over distance a, no further relative movement will be permitted in the energy absorbing stroke between the shoes 25 and housing 3. Bar 17 will be forced to slide frictionally relative to shoes 25 and dissipate the input energy at a substantially uniform force level in the form of heat. Some energy will be stored in the spring 49 as it continues to be compressed.

Upon removal of the input force or its dissipation, the energy stored in spring 49 will urge the bar 17 to the right in the direction of the return stroke. Initially, the bar 17 and shoes 25 will move as a unit through relatively free sliding of lower friction shoe 25 relative to lower housing member 7. During this movement, the links 41 will pivot to again engage pivot pins 44 and close angle α. This pivoting of links 41 will urge the upper friction shoe 25 upwardly to relieve the force applied by spring 35 between the shoes 25 and bar 17. As this force is relieved, bar 17 will be allowed to move relative to the friction shoes 25 by the remaining energy stored in spring 49 until the inactive position of the damper 1 is again obtained.

It will be recognized from the foregoing description that various design parameters must be maintained to ensure operativeness of damper 1. In order for the return stroke to initiate, assuming negligible effect of spring 35, the return force of spring 49 must be greater than the product of the normal force of spring 35 and the coefficient of friction between lower friction shoe 25 and lower housing member 7. For the return stroke to continue and be completed, the return force of spring 39 must always be greater than:

$$F_{35}(\mu_1 + \mu_2)(1/1 + [\mu_1/\tan \alpha])$$

wherein:

$F_{35}$ = normal force of spring 35;
$\mu_1$ = coefficient of friction between shoes and bar;
$\mu_2$ = coefficient of friction between shoe and housing; and
α = angle of inclination of link 41.

To fully appreciate the easy return feature of the damper 1, a comparision should be made of the necessary return force and the resistant frictional force in the energy absorbing stroke. The ratio of return force to friction force is $$\tfrac{1}{2}(\mu_2/\mu_1)$$

to initiate return, and $$\tfrac{1}{2}[1 + (\mu_2/\mu_1)][1/1 + (\mu_1/\tan \alpha)]$$

to complete the return stroke. Typical valves might be as follows:

$\mu_1 = 0.32$
$\mu_2 = 0.04$
$\tan \alpha = 0.06$ ($\alpha = 3\tfrac{1}{2}°$).

In this instance, the ratio of return force to frictional force to initiate return would be 0.063 and to complete the return stroke would be 0.089. Thus, the force of spring 39 must only be 0.089 times the frictional force for the damper 1 to have complete self-return features.

Figure 3:
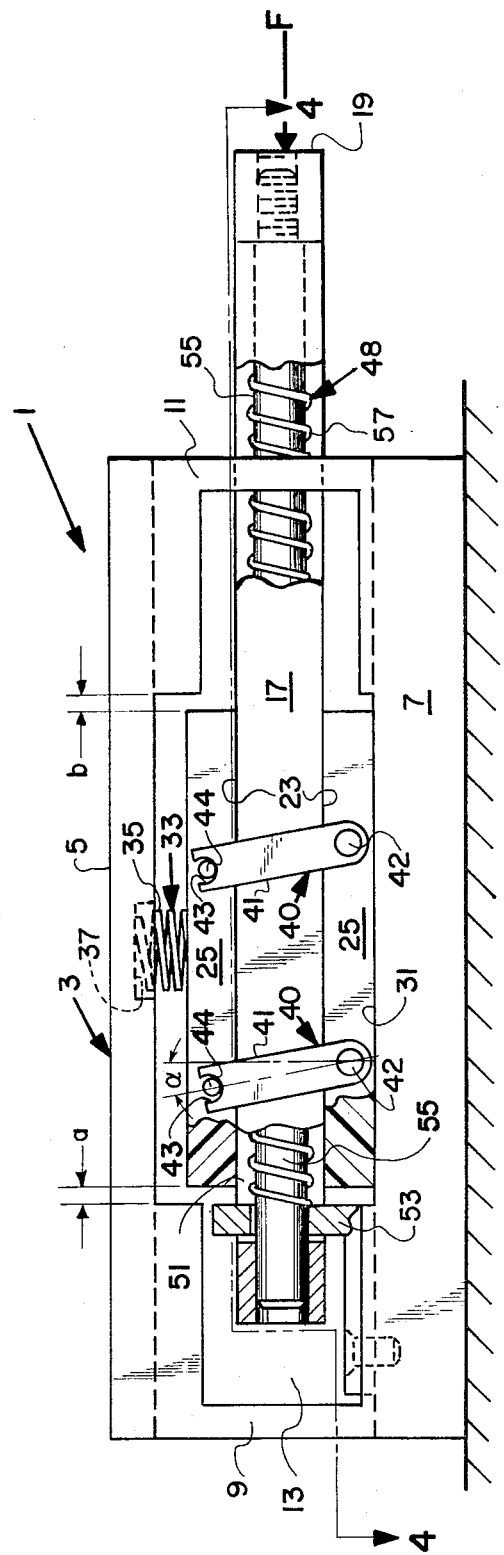
FIG. 3 is a side elevation view with parts in section of another embodiment of a friction damper of this invention.

In FIGS. 3 and 4 there is shown an embodiment of the present invention wherein the return spring means 48 is contained or housed within the bar 17. As shown, bar 17 includes an elongate cavity 51 formed intermediate opposite ends thereof and extending substantially the length thereof. An L-shaped bracket 53 is fixedly secured to the lower housing member 7 by one leg with the other leg received in the cavity 51 of bar 17 adjacent the end remote from the reaction surface 19. A guide rod 55 is disposed within and through the cavity 51 parallel to the bar 17. One end of the guide rod 55 is threadably received in the end of bar 17 having the reaction surface 19. The other end of the guide rod 55 is slidably disposed through the other leg of bracket 53.

Spring means 48 comprising a coil spring 57 is wound about or disposed concentric to the guide rod 55 within the cavity 51. The spring 57 is restrained or compressed between bracket 53 and the end of the bar 17 adjacent reaction surface 19. Upon reaction surface 19 receiving an input force F urging the bar 17 in the energy absorbing stroke, the spring 57 will be compressed against the leg of bracket 53 to store energy to initiate and complete the return stroke upon removal of the input force F. Other features of the damper of FIGS. 3 and 4 are similar to the damper of FIGS. 1 and 2.

FIG. 5 shows an alternate embodiment to that of FIGS. 1 and 2 wherein additional frictionally engaging surfaces have been utilized to increase the energy absorbing capabilities of the damper without increasing the normal force created by spring means 33 or the return force of return spring means 48. In this embodiment three friction shoes 25 and two bar sections 17a and 17b are employed. As shown the friction shoes and bars are alternately arranged between the lower housing member 7 and a top plate 63 that mates with the uppermost friction shoe 25. The spacing means 40 is operative between the lower housing member 7 and top plate 63 to relieve the force of spring 35 in the return stroke. The bars 17a and 17b are joined at one end to insure movement as a unit. In this instance spring means 48 is a coil spring 58 positioned intermediate bar sections 17a and 17b. Operation of the damper is identical to that of FIG. 1 with the addition of other frictional surfaces to increase the energy absorbing capabilities thereof.

In the embodiments thus far described, the work surfaces 23 of bar 17 and drag surfaces 27 of shoes 25 have been oriented normal to the force of spring 35. It will be apparent that other orientations may be employed such as that shown in FIG. 6. There the shoes 25 include longitudinally extending grooves having opposed work surfaces 23 that diverge toward bar 17. Bar 17 includes mating opposed drag surfaces 27 that converge toward shoes 25. In this way the normal force between the working surfaces 23 and drag surfaces 27 will be amplified over that of spring 35. A gap 29 is provided between the base of each groove and bar to ensure that the pressure of spring 35 is transmitted across the mating surfaces 23 and 27 and to allow clearance for wear thereof.

In FIG. 7 there is shown another embodiment of the present invention similar to that of FIG. 1 wherein return spring means 48 is a convolutely wound constant force return spring 65. One end of the spring 65 is received within an elongate recess 67 in the bar 17 and secured for movement therewith by a rivet 68. The body of spring 65 is positioned and convolutely wound externally of the housing 3 adjacent the end thereof proximate to reaction surface 19. Upon movement of bar 17 in the energy absorbing stroke, the spring 65 is unwound with the unwound portion being stored in the recess 67 of bar 17. Upon removal of the input force F, the energy stored in spring 65 urges bar 17 in the return stroke whereupon the spring 65 reassumes its convolutely wound condition. A spring of this type is noted for its deflection and return at a constant force level. Thus, such a constant force spring in conjunction with the constant force level of the friction characteristics of the damper provide a damper having a square load deflection curve which gives maximum energy dissipation and storage for a given resisting force.

While not necessary, it is desired that spring 35 not have any resistance to motion in the direction of the energy absorbing stroke or the return stroke. In FIG. 8 there is shown an arrangement wherein such a resistance has been eliminated. More particularly, spring 35 is separated from upper housing member 5 by a pair of spaced rollers 85 that bear against the underneath upper housing member 5 and against a spring retaining plate 87 that abuts the end of spring 35. Forces of the spring 35 normal to the bar 17 will be transmitted between the bar 17 and shoes 25. However, upon movement of the upper shoes 25 relative to the housing 35 distances $a$ and $b$, relatively free rolling action will take place between the upper housing member 5 and retaining plate 87. Thus, spring 35 moves freely in the energy absorbing and return stroke and provides no more resistance thereto.

In FIGS. 9 and 10 somewhat different spacing means 40 are illustrated which are inactive in the energy absorbing stroke and active in the return stroke to relieve the pressure of spring 35 between the frictionally engaging surfaces. The spacing means 40 comprises a plurality of rolling elements 98 such as spheres or cylinders that are received in longitudinally spaced recesses in lower housing member 7 on surfaces 101 inclined upwardly at an angle $\beta$ toward the bar 17 in the direction of the return stroke. In FIG. 9 the elements 98 are biased up the inclines by springs 109. In FIG. 10 the elements 98 are biased up the inclines by magnets 110. The upper friction shoe 25 rests upon the elements 98. During the energy absorbing stroke of bar 17, the elements 98 are rolled down the inclines by virtue of rolling friction against the upper friction shoe 25 until substantially the force of spring 35 is applied between the shoes 25 and bar 17. The rolling motion takes place against the force of springs 109 or the pull of magnets 110 both of which are very small and merely sufficient to bias the elements up the incline surfaces 101. When the input force $F$ is removed from reaction surface 19, the return spring 49 initiates movement of the bar 17 in the return stroke by relatively free sliding movement of the bar 17 and shoes 25 as a unit relative to lower housing member 7. During this movement, friction causes the rolling elements 98 to roll up the inclines, lifting upper friction shoe 25 and relieving the pressure of spring 35. The return stroke of bar 17 is completed by the return force of spring 49.

In the drawings and specification, there has been set forth a preferred embodiment of the invention and, although specific terms are employed, they are used in a generic and descriptive sense only and not for purposes of limitation.

What is claimed is:

1. A friction damper comprising
   a housing,
   an elongate bar disposed longitudinally within said housing, said housing and bar being capable of reciprocating movement longitudinally relative to each other in an energy absorbing stroke and return stroke,
   friction shoe means disposed between said housing and bar for movement parallel to said bar and housing,
   resilient means urging said shoe means and one of said housing and bar transversely relative to the other of said housing and bar and normally maintaining sliding frictional engagement between said shoe means and the one said housing and bar,
   said shoe means and the other of said housing and bar being disposed for and subject to limited relatively free sliding relative movement between each other substantially independent of said resilient shoe urging means,
   means for limiting the movement of said shoe means relative to the other of said housing and bar in the energy absorbing stroke beyond said relatively free sliding relative movement, and
   spacing means operative independently of said resilient shoe urging means in response to said free sliding relative movement for controlling the spacing between said shoe means and the one of said housing and bar, said spacing means being operative in the energy absorbing stroke to permit maintenance of frictional engagement by said independent resilient shoe urging means between said shoe means and the one of said housing and bar, said spacing means being operative in the return stroke in response to and during said relatively free sliding relative movement to positively increase the spacing between said shoe means and the one of said housing and bar and relieve said frictional engagement.

2. A friction damper, according to claim 1, including return means for urging relative movement between said housing and bar in the return stroke.

3. A friction damper, according to claim 2, wherein said return means comprises resilient means operatively disposed between said housing and bar for compression during the energy absorbing stroke.

4. A friction damper, according to claim 1, wherein said spacing means comprises link means pivotally mounted adjacent opposite ends between said shoe means and the other of said housing and bar, said link means pivoting in response to relative movement between said shoe and other of said housing and bar.

5. A friction damper, according to claim 1, wherein said resilient shoe urging means comprises spring means compressed between said shoe means and the other of said housing and bar and wherein said spacing means comprises link means pivotally mounted adjacent opposite ends between said shoe means and other of said housing and bar, said link means being normally inclined longitudinally relative to the housing and bar and pivoting in response to relative movement between said shoe means and other of said housing and bar.

6. A friction damper, according to claim 1, wherein said spacing means comprises rolling elements mounted in rolling engagement between said shoe means and the other of said housing and bar on surfaces inclined longitudinally relative to said housing and bar, and means for resiliently biasing said rolling elements up said inclined surfaces.

7. A friction damper comprising
   a housing,
   an elongate bar disposed longitudinally within said housing for reciprocating movement longitudinally thereof in an energy absorbing stroke and return stroke,
   friction shoe means disposed between said housing and bar for limited reciprocating movement parallel and relative to said housing,
   resilient means disposed between said shoe means and housing and urging said shoe means and bar transversely relative to said housing and normally maintaining sliding frictional engagement between said shoe means and bar,
   said shoe means and bar being disposed for and subject to limited relatively free sliding movement relative to said housing substantially independent of said resilient shoe urging means and said bar being subject to sliding frictional movement relative to said shoe means, spacing means operative independently of said resilient shoe urging means in response to said free sliding relative movement for controlling the spacing between said shoe means and bar, said spacing means being operative in the energy absorbing stroke to permit maintenance of frictional engagement by said independent resilient shoe urging means between said shoe means and bar, said spacing means being operative in the return stroke in response to and during said relatively free sliding movement to positively increase the spacing between said shoe means and said bar and relieve said frictional engagement, and means for returning said bar in the return stroke.

8. A friction damper, according to claim 7 wherein said return means comprises resilient spring means disposed between said housing and bar, said spring means being compressed during the energy absorbing stroke of said bar.

9. A friction damper, according to claim 7, wherein one end of said bar extends through and beyond one end of said housing, said one end of said bar defining a reaction surface for receiving an input force urging said bar in the energy absorbing stroke.

10. A friction damper, according to claim 7, wherein one end of said bar extends through and beyond one end of said housing, and includes a reaction member carried by said one end of said bar defining a reaction surface for receiving an input force urging said bar inwardly of said housing in the energy absorbing stroke, and wherein said return means comprises resilient spring means disposed between said housing and reaction member for compression during the energy absorbing stroke of said bar.

11. A friction damper, according to claim 10, wherein said return spring means comprises a coil spring disposed about said bar, with one end of said spring abutting said one end of said housing and the other end abutting said reaction member.

12. A friction damper, according to claim 9, wherein said bar has an elongated cavity disposed therein, stop means received in said cavity for sliding movement longitudinally thereof and carried by said housing, a guide rod extending lengthwise of said cavity parallel to said bar and being slidably disposed through said stop means, said rod being affixed to said bar, a coil spring disposed about said rod within said cavity and restrained between said stop means and the forward end of said cavity.

13. A friction damper, according to claim 9, wherein said resilient shoe urging means comprises spring means compressed between said shoe means and the adjacent side of said housing and wherein said spacing means comprises link means pivotally mounted adjacent opposite ends between said shoe means and the opposite side of said housing, said link means being inclined longitudinally relative to the housing and bar in the direction of the energy absorbing stroke, said link means pivoting in response to relative movement between said shoe means and housing in the energy absorbing stroke to permit sliding frictional engagement between said shoe means and bar and pivoting in response to relative movement between said shoe and housing in the return stroke to increase the spacing between said shoe means and said opposite housing side to relieve said frictional engagement.

14. A friction damper, according to claim 13, wherein pivoting of said link means is restricted to angles of inclination relative to the housing and bar in the direction of the energy absorbing stroke greater than 0°.

15. A friction damper, according to claim 13, wherein said link means is disengageable from at least one of said shoe means and housing upon pivoting in the energy absorbing stroke whereby said link means does not restrain said shoe urging means and is reengageable upon pivoting in the return stroke.

16. A friction damper, according to claim 13, wherein said link means disengage from at least one of said shoe means and housing during said relatively free movement between said shoe means and housing in the energy absorbing stroke and reengages and pivots during said relatively free movement between said shoe means and housing in the return stroke to relieve the frictional engagement between said shoe means and bar.

17. A friction damper comprising a housing having opposed ends and sides, an elongate bar disposed longitudinally within said housing for reciprocating movement longitudinally thereof in an energy absorbing stroke and return stroke, one end of said bar extending through and beyond one end of said housing and defining a reaction surface for receiving an input force urging said bar inwardly of said housing in the energy absorbing stroke, first and second friction shoes disposed between said housing and bar on opposite sides of said bar for limiting reciprocating movement parallel and relative to said housing, resilient means precompressed between said first shoe and one side of said housing and urging said first shoe, bar, second shoe and opposite side of said housing into frictional engagement, said second shoe being subject to limited relatively free sliding movement relative to said housing and said bar being subject to sliding frictional movement relative to each of said shoes, link means pivotally mounted adjacent opposite ends between said first shoe and the opposite side of said housing, said link means being inclined longitudinally relative to the housing and bar in the direction of the energy absorbing stroke, said link means pivoting in response to relatively free movement between said first shoe and housing in the energy absorbing stroke to permit sliding frictional engagement between said first and second shoes and bar and pivoting in response to relatively free movement between said first shoe and housing in the return stroke to increase the spacing between said first shoe and said opposite housing side to relieve frictional engagement between said shoes, bar and housing, resilient means disposed between said housing and bar, said resilient means being compressed during the energy absorbing stroke of said bar and urging said bar in the return stroke.

18. A friction damper comprising a housing having opposed ends and sides, an enlongate bar disposed longitudinally within said housing for reciprocating movement longitudinally thereof in an energy absorbing stroke and return stroke, one end of said bar extending through and beyond one end of said housing and defining a reaction surface for receiving an input force urging said bar inwardly of said housing in the energy absorbing stroke, first and second friction shoes disposed between said housing and bar on opposite sides of said bar for limited reciprocating movement parallel and relative to said housing, resilient means precompressed between said first shoe and one side of said housing and urging said first shoe, bar, second shoe and opposite side of said housing into frictional engagement, said second shoe being subject to limited relatively free sliding movement relative to said housing and said bar being subject to sliding frictional movement relative to each of said shoes, said opposite side of said housing having longitudinally spaced and extending recesses, said recesses having base surfaces inclined longitudinally of said housing in the direction of the return stroke, rolling elements mounted in said recesses in rolling engagement between said inclined surfaces and said first shoe, means for resiliently biasing said rolling elements up said inclined surfaces, said rolling elements rolling down said inclines in response to relative movement between said first shoe and housing in the energy absorbing stroke to permit sliding frictional engagement between said first and second shoes and bar and rolling up said inclines in response to relative movement between said first shoe and housing in the return stroke to increase the spacing between said first shoe and said opposite housing side to relieve frictional engagement between said shoes, bar and housing, and resilient means disposed between said housing and bar, said resilient means being compressed during the energy absorbing stroke of said bar and urging said bar in the return stroke.

* * * * *

UNITED STATES PATENT OFFICE
CERTIFICATE OF CORRECTION

PATENT NO. : 3,866,720
DATED : February 18, 1975
INVENTOR(S) : Leon Wallerstein, Jr.

It is certified that error appears in the above-identified patent and that said Letters Patent are hereby corrected as shown below:

Column 3, line 24, "friction" should be -- frictional -- ;
Column 3, line 61, "spring means 40" should be -- spacing means 40 -- ;
Column 4, line 32, "fractionally" should be -- frictionally -- ;
Column 5, line 45, "must only be" should be -- must be only -- ;
Column 6, line 57, "friction" should be -- frictional -- ;
Column 7, line 9, delete "more" ;
Column 7, line 62, (claim 1) "one said housing" should be -- one of said housing -- ;
Column 9, line 28, (claim 10) "includes" should be -- including -- ;
Column 9, line 29, (claim 10) after "said bar" add -- and -- ; and
Column 10, line 33, (claim 17) "limiting" should be -- limited -- .

Signed and Sealed this second Day of September 1975

[SEAL]

Attest:

RUTH C. MASON
Attesting Officer

C. MARSHALL DANN
Commissioner of Patents and Trademarks